United States Patent
Bravo et al.

(10) Patent No.: US 11,809,536 B2
(45) Date of Patent: Nov. 7, 2023

(54) HEADPHONE BIOMETRIC AUTHENTICATION

(71) Applicant: KYNDRYL, INC., New York, NY (US)

(72) Inventors: Cesar Augusto Rodriguez Bravo, Alajuela (CR); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 375 days.

(21) Appl. No.: 16/811,096

(22) Filed: Mar. 6, 2020

(65) Prior Publication Data

US 2021/0279314 A1    Sep. 9, 2021

(51) Int. Cl.
   *G06F 21/00* (2013.01)
   *G06F 21/32* (2013.01)
   *G10L 17/06* (2013.01)
   *G10L 17/00* (2013.01)

(52) U.S. Cl.
   CPC .............. *G06F 21/32* (2013.01); *G10L 17/00* (2013.01); *G10L 17/06* (2013.01)

(58) Field of Classification Search
   CPC .......... G06F 21/32; G10L 17/00; G10L 17/06
   See application file for complete search history.

(56) References Cited

U.S. PATENT DOCUMENTS

| | | | |
|---|---|---|---|
| 7,082,393 B2 | 7/2006 | Lahr | |
| 2010/0205541 A1* | 8/2010 | Rapaport | G06Q 10/10 715/753 |
| 2012/0212322 A1* | 8/2012 | Idsoe | G07C 9/37 340/5.53 |
| 2016/0183014 A1 | 6/2016 | Guo et al. | |
| 2018/0227658 A1* | 8/2018 | Hviid | H04M 1/6066 |
| 2018/0375660 A1* | 12/2018 | Yildiz | H04W 4/80 |

(Continued)

FOREIGN PATENT DOCUMENTS

| | | |
|---|---|---|
| CN | 106170795 A | 11/2016 |
| CN | 107800923 A | 3/2018 |

(Continued)

OTHER PUBLICATIONS

Munir et al., "Design of 3D Scanner for Surface Contour Mapping by Ultrasonic Sensor," The 5th Asian Physics Symposium (APS 2012), AIP Conference Proceedings 1656, 04006, pp. 1-4, 2015, AIP Publishing.

(Continued)

*Primary Examiner* — Brandon Hoffman
*Assistant Examiner* — William A Corum, Jr.
(74) *Attorney, Agent, or Firm* — Dan Housley; Andrew. M Calderon; Calderon Safran & Cole, P.C.

(57) ABSTRACT

A voice signal in a headphone is detected. The voice signal includes a person speaking an audible command. Based on detecting the voice signal a first biometric signature of a user is retrieved. The first biometric signature is compared to one or more biometric features of the person. Based on comparing the first biometric signature to the one or more biometric features an authentication of the user is determined. An authentication action is performed based on the detected voice signal. The authentication action is performed in response to verifying the authentication.

20 Claims, 5 Drawing Sheets

(56) References Cited

U.S. PATENT DOCUMENTS

| | | | | |
|---|---|---|---|---|
| 2019/0208076 A1* | 7/2019 | Berman | ................ | H04L 9/3231 |
| 2019/0265508 A1* | 8/2019 | Castañeda | .............. | H05K 1/189 |
| 2019/0347386 A1* | 11/2019 | Rahmel | ............... | H04W 12/065 |
| 2020/0202313 A1* | 6/2020 | Eidam | .................... | A61B 5/117 |
| 2020/0342878 A1* | 10/2020 | Lee | ......................... | G10L 17/00 |
| 2021/0319782 A1* | 10/2021 | Gong | ...................... | G10L 15/08 |

FOREIGN PATENT DOCUMENTS

| | | |
|---|---|---|
| EP | 3432606 A1 | 1/2019 |
| JP | 2018534014 A | 11/2018 |
| JP | 2019520864 A | 7/2019 |
| WO | 2018053225 A1 | 3/2018 |
| WO | 2019053220 A1 | 3/2019 |

OTHER PUBLICATIONS

Yao, C. W., "An ultrasonic method for 3D reconstruction of surface topography," Journal of Physics Communications, 2, 2018, 055034, pp. 1-11, IOP Publishing. https://doi.org/10.1088/2399-6528/aac691.

Mohamed et al., "A Survey on 3D Ultrasound Reconstruction Techniques," Artificial Intelligence—Applications in Medicine and Biology, Apr. 27, 2019, pp. 1-20, IntechOpen. DOI: http://dx.doi.org/10.5772/intechopen.81628.

\* cited by examiner

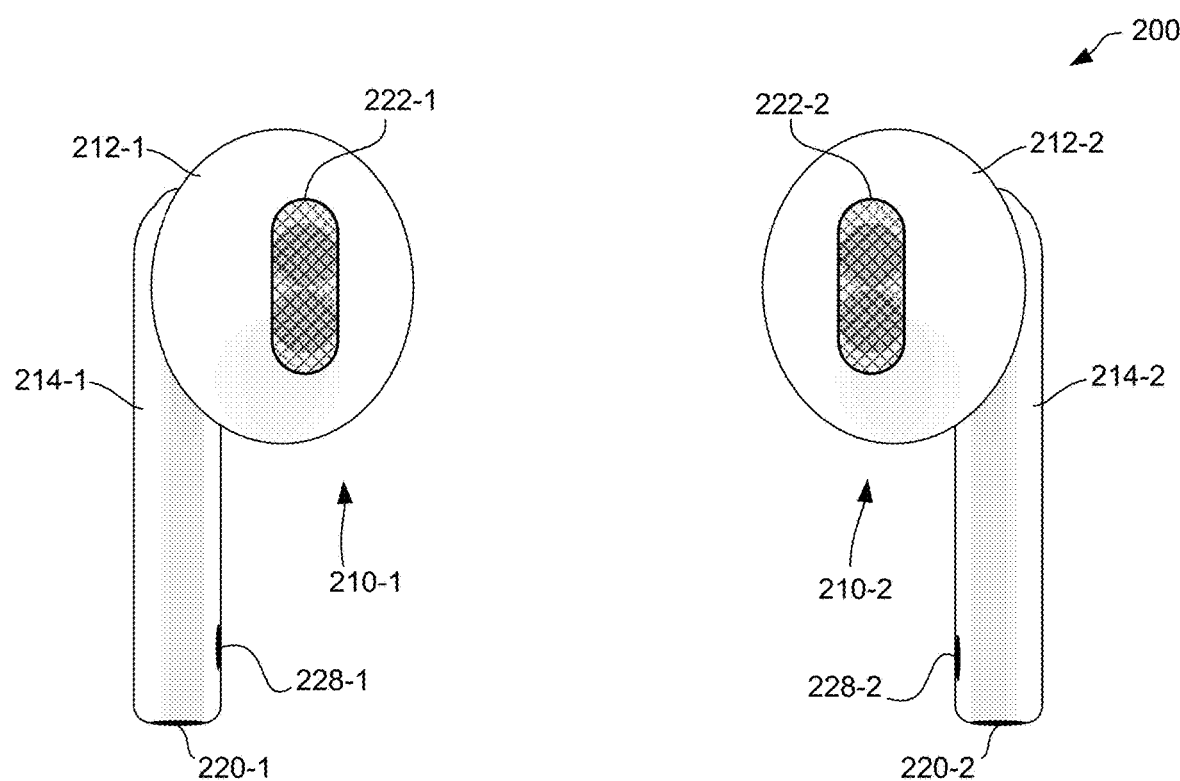
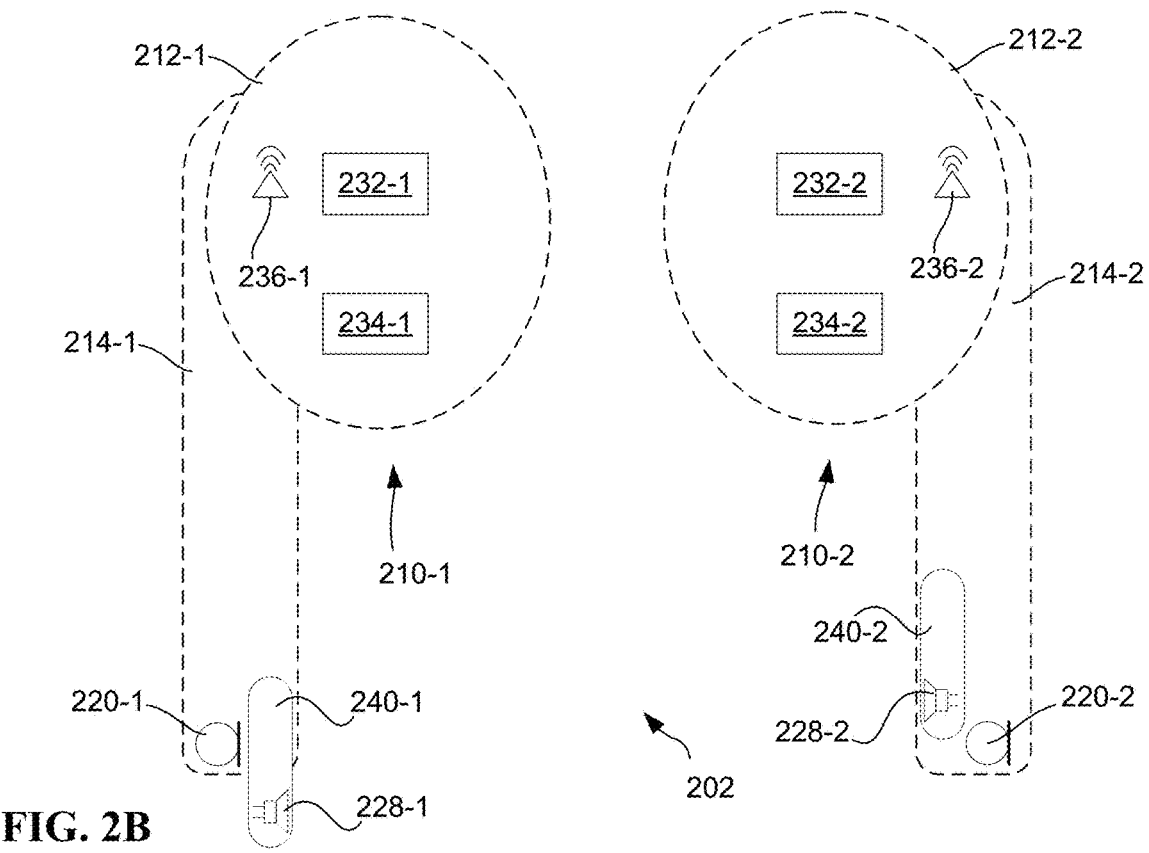
FIG. 2A
FIG. 2B

HEADPHONE BIOMETRIC AUTHENTICATION

BACKGROUND

The present disclosure relates to processing voice data, and more specifically, to authenticating a user before processing audible commands in voice data.

Headphones are popular devices that may be used in speaking with people. Voice-based assistances (voice assistants) are devices that may be configured to respond to the speaking of users to perform commands. Voice assistants may not always authenticate that a person is an authorized user before performing commands.

SUMMARY

According to embodiments of the present disclosure, disclosed are a method, system, and computer program product.

A voice signal in a headphone is detected. The voice signal includes a person speaking an audible command. Based on detecting the voice signal a first biometric signature of a user is retrieved. The first biometric signature is compared to one or more biometric features of the person. Based on comparing the first biometric signature to the one or more biometric features an authentication of the user is determined. An authentication action is performed based on the detected voice signal. The authentication action is performed in response to verifying the authentication.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2A depicts an external view of a two-factor biometric headphone (TFBH) capable of capturing one or more biometric features of a person, consistent with some embodiments of the disclosure;

FIG. 2B depicts a partial view of the TFBH with the casing removed, consistent with some embodiments of the disclosure;

Figure 1:
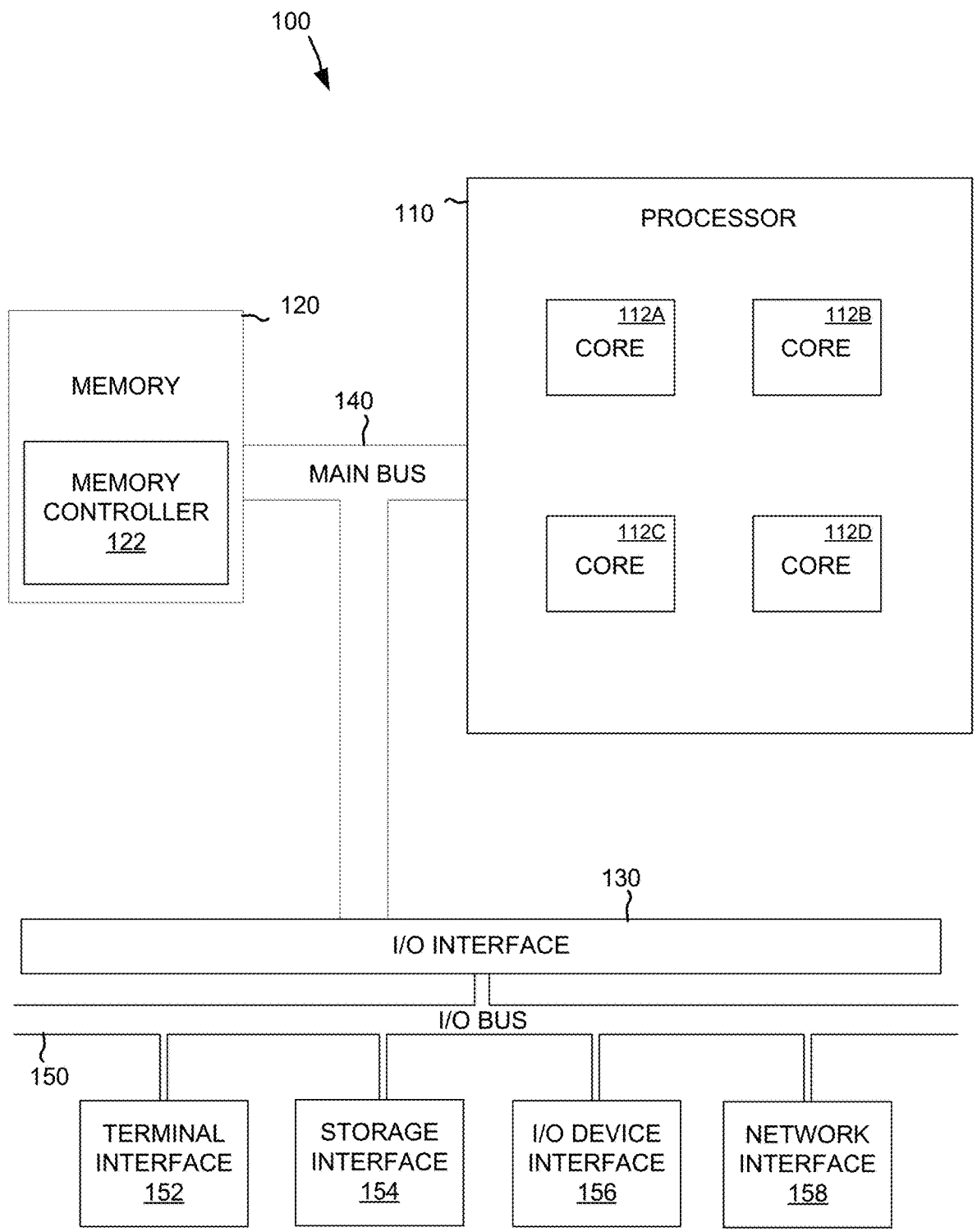
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to processing voice data; more particular aspects relate to authenticating a user before processing audible commands in voice data. While the present disclosure is not necessarily limited to such applications, various aspects of the disclosure may be appreciated through a discussion of various examples using this context.

Headphones that operate in conjunction with smartphones and other computing devices or smart devices (e.g., smart watches, cellular phones, laptops, computers, smart homes, smart televisions) are gaining in popularity. For example, a headphone may be a wireless earbud. Headphones may take the form of headsets, earphones, earbuds, or other relevant technology. With the advent of smart devices, there is in some cases an increasing usage of voice-based interfaces (voice interfaces). In a voice interface a user can perform spoken communication with headphones. For example, a headphone may be paired with a mobile device, and a user can speak into the headphone to perform interactions through the voice interface.

A voice interface may be able to provide much of the functionality provided by graphical user interfaces. For example, by issuing commands to an artificial intelligence (AI) voices assistance system (voice assistant), user can submit voice command from a headphone. Further, the voice assistance system may also respond to a user; the user can get information from a computing device including private information of the user (e.g., text messages, passwords, unlocking commands) through audible responses from the voice interface. Voice interfaces may cause a security issue as voice-based systems may only be designed to respond to a recognized word or spoken command within a voice signal. Voice-based systems may not take the processing power and time to identify the person that was speaking.

Some systems may only provide security based on a preexisting relationship between the physical devices. For example, a voice-based system may include wireless earbud style headphones and a smartphone computer. The wireless earbuds and the smartphone may be paired with each other at a previous time through a wireless networking protocol. Once paired, the existing system may always treat the pairing as a sign that the person speaking has control over both the earbuds and the smartphone. This does not take into account a situation where a user may leave the earbuds unattended and another person may pick them up and speak into them and issue commands to the smartphone. The voice-based system in this case only performs a one-time authentication based on the formation of a network. In some cases, a voice-based system may perform a single factor authentication based on the voice of the user. For example, by matching a voice profile of a user with an existing biometric signature of a voice. This may have the drawback of performing authentication based solely an audible signal. The audible signal may, however, be spoofed by prerecording a user by any third-party person.

A two-factor biometric headphone (TFBH) may overcome the technical deficiencies of existing headphones by verifying the biometrics of a user. A TFBH may operate by verifying a second factor by gathering one or more biometric features of a person. The biometric features may include the pattern or shape of the nose of a person that is wearing the headphones. The biometric features may include the pattern, shape, or print of the lips of a person. The biometric features may include the movement, curl, range of movement, or other motion of the lips of a person as the person speaks. The biometric features may include one or more features of the face that are captured as a three-dimensional representation. The three-dimensional representation may be based upon ultrasound, a light field camera, a dot-projector and corresponding receiver, or other relevant mapping technology. The biometric features may be a composite mapping generated by combining a left side and a right side of a face.

The biometric features may be compared to a biometric signature. In some embodiments, the TFBH may operate by analyzing a voice signature in addition to biometric features of a nose, lip, or other part of a face. This secondary factor may be difficult to fake (e.g., it may be difficult to fake the shape of one or more external features of a user and also fake a voice signature). In some embodiments, the biometric signature may not be an audible signal or voice pattern of a person. For example, the TFBH may not scan a voice for biometric features, may not analyze a pattern of speech, or may not otherwise scan the audible signal of a person to authenticate the person.

The TFBH may be triggered based on detecting the speaking of a person. The TFBH may be triggered based on performing natural language processing to detect a voice-command that is issued within a voice signal. For example, by performing natural language processing to listen for a wake word that indicates that the pattern of speech following the wake word would be a command. In some embodiments, the TFBH may not execute or not perform an audible command until authentication has taken place based on comparing the biometric features that are received with a biometric signature of a user (e.g., previously recorded biometrics that the user has indicated belong to the user).

In some embodiments, a natural language processing system may include various components' (not depicted) operation through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from voice interfaces. Various components (not depicted) of the natural language processor may include, but are not limited to, a tokenizer, a part-of-speech (POS) tagger, a semantic relationship identifier, and a syntactic relationship identifier.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., spoken commands previously received from voice interfaces). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving an audible command spoken from a person and as part of an audible voice signal, the natural language processor may output parsed text elements from the post as data structures. In some embodiments, a parsed text element may be represented in the form of a parse tree or other graph structure. To generate the parsed text element, the natural language processor may trigger computer modules including the tokenizer, the part-of-speech (POS) tagger, the semantic relationship identifier, and the syntactic relationship identifier.

FIG. 1 depicts the representative major components of an example computer system 100 (alternatively, computer) that may be used, in accordance with some embodiments of the present disclosure. It is appreciated that individual components may vary in complexity, number, type, and\or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

FIG. 2A depicts an external view of a TFBH 200 capable of capturing one or more biometric features of a person, consistent with some embodiments of the disclosure. The TFBH may include a pair of headphones including a right headphone 210-1 and a left headphone 210-2. The pair of headphones 210-1, 210-2 and its constituent components may be referred to herein as reference number 210 for the sake of simplicity. The pair of headphones 210 may be a plastic, polycarbonate, or other suitable material.

The right headphone 210-1 may include a speaker housing 212-1 and an auxiliary stem 214-1. Speaker housing 212-1 may be rounded, egg-shaped, or otherwise shaped to fit within an ear of the user. For example, speaker housing 212-1 may be shaped to fit within the concha of the right ear of a user. The auxiliary stem 214-1 may extend away from the speaker housing 212-1. For example, when the right headphone 210-1 is worn in an ear of a user, the auxiliary steam 214-1 extends towards a face of the user.

Speaker housing 212-1 may include speaker 222-1. The speaker 222-1 may be a transducer integrally coupled to the speaker housing 212-1 and designed to direct sound down into the right ear of a user. The speaker 222-1 may be configured to convert electrical signals into audible sounds for hearing by a user.

Auxiliary stem 214-1 may include a microphone 220-1 and a facial mapper 228-1. The microphone 220-1 may be integrally coupled to or located within the auxiliary stem 214-1. The microphone 220-1 may be configured to receive a voice signal from a person wearing the headphone, such as speech of a telephone call or a voice command. The facial mapper 228-1 may be an ultrasonic transceiver including a transmitter and sensor configured to map or otherwise create a three-dimensional mapping or biometric signature of facial features. The facial mapper 228-1 may also use another relevant technology for mapping facial features, such as a light field camera, a dot projector and receiver, etc. For example, the facial mapper 228-1 may be configured to map the face, the lips, the nose, the brow, or movement of the lips. Facial mapper 228-1 may map the right side of the face of a person.

Likewise, the left headphone 210-2 may include a speaker housing 212-2 and an auxiliary stem 214-2. Speaker housing 212-2 may be rounded, egg-shaped, or otherwise shaped to fit within an ear of the user. For example, speaker housing 212-2 may be shaped to fit within the concha of the left ear of a user. The auxiliary stem 214-2 may extend away from the speaker housing 212-2. For example, when the left headphone 210-2 is worn in an ear of a user, the auxiliary steam 214-2 extends towards a face of the user.

Speaker housing 212-2 may include speaker 222-2. The speaker 222-2 may be a transducer integrally coupled to the speaker housing 212-2 and designed to direct sound down into the left ear of a user. The speaker 222-2 may be configured to convert electrical signals into audible sounds for hearing by a user.

Auxiliary stem 214-2 may include a microphone 220-2 and a facial mapper 228-2. The microphone 220-2 may be integrally coupled to or located within the auxiliary stem 214-2. The microphone 220-2 may be configured to receive a voice signal from a person wearing the headphone, such as speech of a telephone call or a voice command. The facial mapper 228-2 may be an ultrasonic transceiver including a transmitter and sensor configured to map or otherwise create a three-dimensional mapping or biometric signature of facial features. The facial mapper 228-2 may also use another relevant technology for mapping facial features, such as a light field camera, a dot projector and receiver, etc. For example, the facial mapper 228-2 may be configured to map the face, the lips, the nose, the brow, or movement of the lips. Facial mapper 228-2 may map the left side of the face of a person.

Facial mapper 228-2 may operate in conjunction with facial mapper 228-1 to generate a complete map of the face of a person wearing the headphones 210. Facial mapper 228-2 may be configured to map features that are not seen by facial mapper 228-1 and conversely facial mapper 228-1 may be configured to map features that are not seen by facial mapper 228-2. A composite facial map of a person wearing headphones may be generated based on a composite set of biometric data collected by facial mapper 228-1 and facial mapper 228-2. The composite set of biometric data may be non-contiguous or non-overlapping. For example, data gathered by facial mapper 228-1 may not be shared by biometric data gathered by facial mapper 228-2.

FIG. 2B depicts a partial view 202 of the TFBH 200 with the casing removed, consistent with some embodiments of the disclosure.

Inside of the speaker housings 212-1 and 212-2 may include one or more internal components. Though not depicted, some embodiments contemplate a system-on-a-chip design that includes all the internal components generated on the same chip-package, substrate, or integrated circuit. The internal components may include the following: a processor 232, a power source 234, and a wireless transceiver 236. For example, speaker housing 212-1 of right headphone 210-1 may include a processor 232-1, a power sources 234-1, and a wireless transceiver 236-1. The power source 234-1 may be a lithium-ion battery or other relevant source of power for powering the processor 232-1 and the wireless transceiver 236-1 and the other components of headphone 210-1. The wireless transceiver 236-1 may be a networking interface configured to wirelessly communicate with an associated computing device, such as a smartphone, laptop computer, or server. The wireless transceiver 236-1 may utilize a wireless networking protocol, a personal area network protocol, or another relevant networking protocol.

Processors 232-1 may be configured to process and receive signals from an attached device (not depicted). Processors 232-1 may also be configured to process and receive the signals from the various sensors (e.g., the microphone 220-1, the speaker 222-1, and the facial mapper 228-1). The processors 232-1 may be configured to compare the biometric features received from the various sensors to a biometric signature (e.g., a stored set of biometric features that are marked as of an authenticated user).

Further, speaker housing 212-2 of left headphone 210-2 may include a processor 232-2, a power source 234-2, and a wireless transceiver 236-2. The power source 234-2 may be a lithium-ion battery or other relevant source of power for powering the processor 232-2 and the wireless transceiver 236-2 and the other components of the headphone 210-2. The power source 234-2 may be a lithium-ion battery or other relevant source of power for powering the processor 232-2 and the wireless transceiver 236-2 and the other components of headphone 210-2. The wireless transceiver 236-2 may be a networking interface configured to wirelessly communicate with an associated computing device, such as a smartphone, laptop computer, or server. The wireless transceiver 236-2 may utilize a wireless networking protocol, a personal area network protocol, or another relevant networking protocol. The wireless transceiver 236-2 may enable communication between left headphone 210-2 and wireless transceiver 236-1 of right headphone 210-1. For example, the left headphone 210-2 and right headphone 210-1 may communicate and collectively perform comparison of biometric features and biometric signatures to determine an authentication of a person using the pair of headphones 210.

Processors 232-2 may be configured to process and receive signals from an attached device (not depicted). Processors 232-2 may also be configured to process and receive the signals from the various sensors (e.g., the microphone 220-2, the speaker 222-2, and the facial mapper 228-2). The processors 232-2 may be configured to compare the biometric features received from the various sensors to a biometric signature (e.g., a stored set of biometric features that are marked as of an authenticated user).

In some embodiments, the pair of headphones 210 may also include a secure segment (not depicted). The secure segment may be a processor, element, or other relevant integrated circuit configured to perform a limited amount of functions. For example, the secure segment may be configured to perform a receipt of a biometric feature in the form of mapped points, vertexes, or other relevant three-dimensional mapping data. The secure segment may also be configured to store received biometric features as a signature (e.g., a signature of a user of the headphones 210). The secure segment may also be configured to compare a received biometric feature to a stored biometric signature. The output of a comparison may be the determination of whether a user is authenticated to perform one or more operations (e.g., audible voice commands, requests for information). The output of the secure segment may only be in the form of a confirmation of whether one or more received biometric features match or do not match a stored biometric signature. The output may be in a format that does not reveal any information about a stored biometric signal (e.g., a binary value indicative of a match or mismatch, a true/false value indicative of a match or mismatch, a Boolean value indicative of a match or mismatch). There may be a singular secure segment located in one of the pair of headphones 210 (e.g., only in left headphone 210-2, only in right headphone 210-1). There may be a secure segment located in each of the pair of headphones 210. In some embodiments, the secure segment may be located in an attached computing device (e.g., a smartphone).

In some embodiments, the headphones 210-1 and 210-2 may have an expandable portion 240-1 and 240-2 (collectively expandable portion 240), respectively. The expandable portion 240 of each headphone 210 may be configured to move from a retracted position to an extended position through the use of tiny motors (e.g., servomotors). For example purposes, FIG. 2B depicts right headphone 210-1 having the expandable portion 240-1 in a first extended position and left headphone 210-2 having the expandable portion 240-2 in a second retracted position. Though depicted for example purposes, some embodiments contemplate that each expandable portion 240-1 and 240-2 may be configured to move in parallel. For example, expandable portion 240-1 may be in a first retracted position at the same time as the expandable portion 240-2 is also in a corresponding second retracted position. Further, expandable portion 240-1 may be in a first extended position at the same time as the expandable portion 240-2 is also in a corresponding second extended position. The extended position of the expandable portions 240 may extend the facial mappers 228 further away from the ear of a person that wears the headphones 210. The extended distance from the ear of the person may permit for further scanning of the features of the face by the facial mappers 228. For example, when the expandable portions 240 are extended, they may be better positioned to capture the lips or nose of a user, and the facial mappers 228 may emit ultrasound to capture the lips' movement and features of the nose of the user. The expandable portions 240 may operate based on a need to perform biometric authentication. For example, each of the expandable portions 240 may be a concentric chamber which can expand or collapse based on the need of ultrasound-based imaging to be performed by the facial mappers 228. Further, while the expandable portions 240 are in a retracted position, the facial mappers 228 may be disabled. Consequently, no capture of biometric features may be performed; however, the microphones 220 may still be active to capture the spoken content of a person using the headphones 210.

Figure 2C:
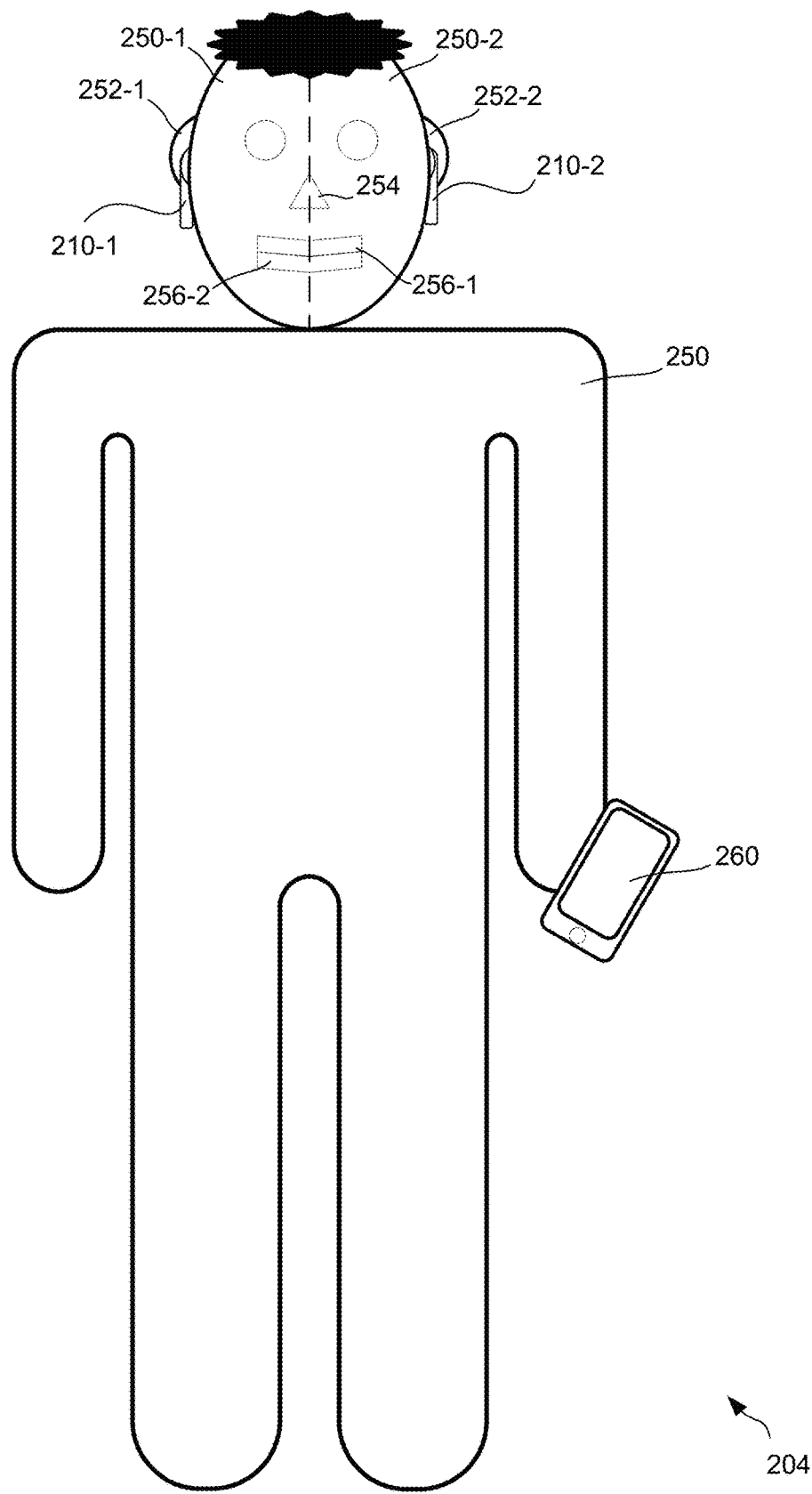
FIG. 2C depicts an example scenario of TFBH usage, consistent with some embodiments of the disclosure.

FIG. 2C depicts an example scenario 204 of use of a TFBH 200, consistent with some embodiments of the disclosure. The TFBH 200 may include headphones 210 having similar capabilities and features as described in FIG. 2A or FIG. 2B. The headphones may be worn by a person 250. Person 250 may also have in their possession a computing device 260 that is communicatively coupled to the headphones 210. The computing device may be a smartphone that contains private information of a user (e.g., credit card information, contacts, images). The person 250 may have one or more biometric features that make the person unique. For example, the person may have the following: two ears 252-1 and 252-2 (collectively 252), a nose 254, and two lips 256 (including an upper lip 256-1 and a lower lip 256-2).

The person 250 may be attempting to access data on the computing device 260 and may have tried to directly access the information. For example, the person 250 may have found the computing device 260 and the headphones 210 at a party and may have tried to unlock the computing device 260. The computing device 260 may be locked with a password or other biometric (e.g., a fingerprint of a user). The computing device 260 and the headphones 210 may have been previously paired with each other by a user (e.g., an owner of the computing device and the headphones that is not depicted). The person 250 may attempt to issue voice commands to the computing device 260 through the headphones 210.

The headphones 210 may prevent an unauthorized access to the contents of the computing device 260. For example, headphones 210 may be capable of perform biometric comparison and determining whether the person is authenticated as a user (e.g., ultrasound scanning or mapping). The headphones 210 may be constantly, periodically, or according to an event-driven schedule, communicating with each other and recognizing each other and cooperatively generating a biometric scan of a face of the person 250. The headphones 210 may send the biometric features of the biometric scan to the computing device 260. Upon receiving a voice command, the headphones 210 may perform one or more natural language processing (NLP) functions to determine that person 250 used a wakeup command (e.g., a specific word or phrase). In some embodiments, the wakeup command can be non-verbal, such as a gesture from a user or signal from the computing device 260. In embodiments with an expandable portion 240, the expandable portions 240-1 and 240-2 may extend into an extended position responsive to detecting a wakeup command.

In some embodiments, the pair of headphones 210 may operate collectively to map the face of person 250. For example, each headphone 210-1 and 210-2 earbud will individually be capturing biometric images of respective sides of person 250. Specifically, the right headphone 210-1 may capture the right side 250-1 of person 250 and the left headphone 210-2 may capture the left side 250-2 of person 250. In some embodiments, the right headphone 210-1 may not capture the left side 250-2 and the left headphone 210-2 may not capture the right side 250-1 of person 250.

During biometric capture of lip shape, lip movement, and nose shape, the headphones 210 may also capture the voice of the user as a voice signal. For example, microphones in right headphone 210-1 and 210-2 may concurrently capture the spoken content of the user. The voice signal containing the spoken audio of the person and the mapping of the biometric features may be then sent to mobile device 260.

In some embodiments, the biometric features may be compared to a biometric signature for determining authentication locally (e.g., on the headphones 210). In some embodiments, the biometric features may be compared to a biometric signature on mobile device 260. In some embodiments, the biometric features may be compared to a biometric signature remotely, such as on a remote server (not depicted).

Figure 3:
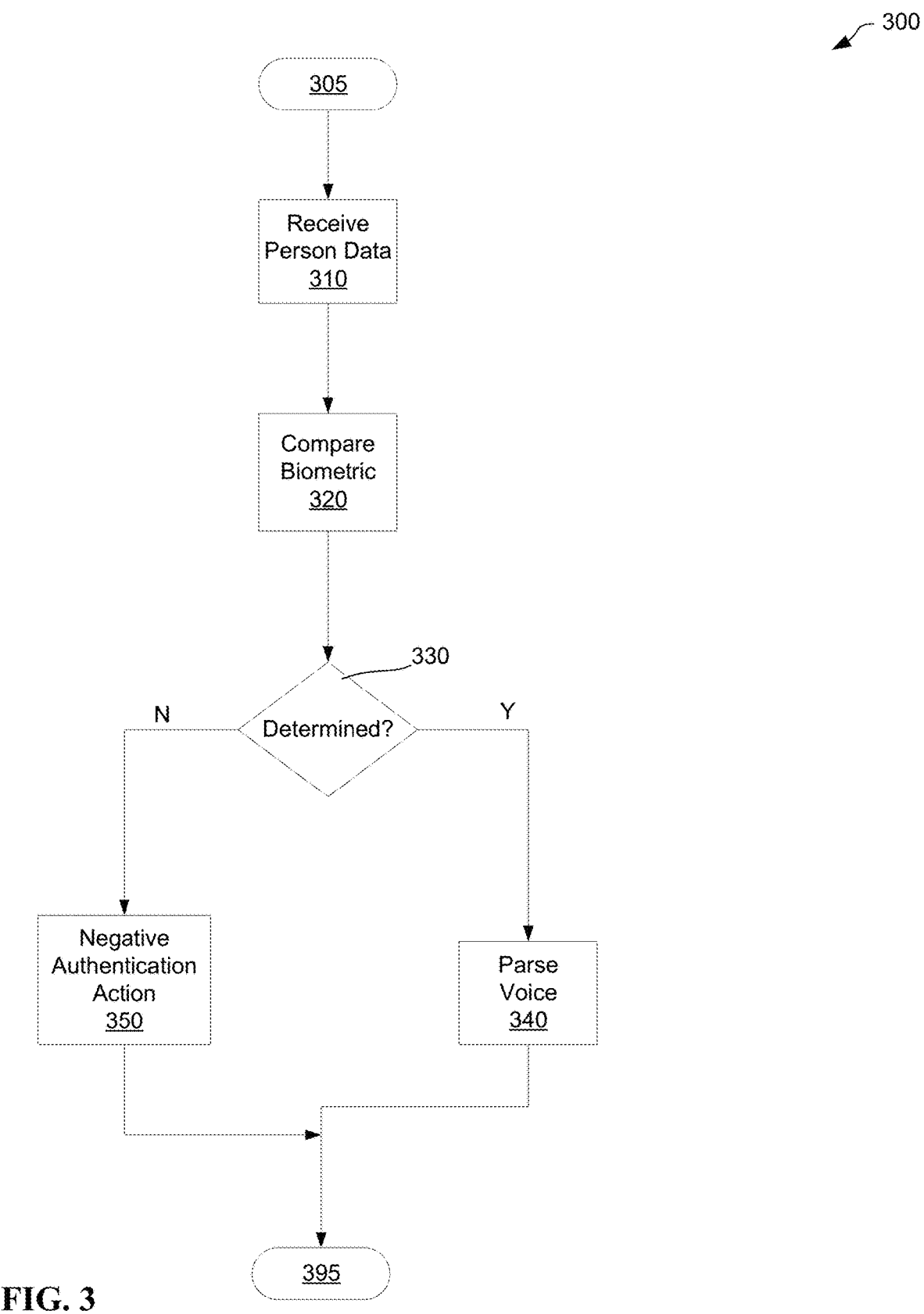
FIG. 3 depicts an example method of handling voice commands, consistent with some embodiments of the disclosure.

FIG. 3 depicts an example method 300 of handling voice commands, consistent with some embodiments of the disclosure. Method 300 may be performed by a computing device. For example, method 300 may be performed by a smartphone, laptop, or tablet of a user. FIG. 1 depicts an example computer system 100 that may operate as a computing device consistent with some embodiments of the disclosure. Method 300 may be performed by a headphone such as headphone 210 of FIG. 2A, FIG. 2B, and FIG. 2C.

Method 300 begins at 305, when data of a person wearing a TFBH 210 is received at 310. The data of the person may be received by a headphone. The data of the person may be received by a computing device and from a headphone. The data of the person may include a voice signal that includes speech or spoken audio of the person. The data of the person may also include one or more biometric features.

At 320 the biometric features may be compared to a biometric signature of a user. For example, a user may have prior to method 300 entered a biometric signature. The biometric signature may contain one or more biometric features, such as lip shape, lip movement, nose shape, and/or other facial features. The biometric signature may have been entered directly with the headphones of the TFBH. The biometric features may have been mapped by another device, for example using a camera of a smartphone to generate the biometric signature. The biometric features received at 310 may be compared to biometric signature to determine if the person using the TFBH is authenticated as the user. Based on the determination of the companion at 330 an authentication action may be performed, such as blocking the voice signal. The biometric features may be compared by comparing a left side of a face of person and a right side of a face of a person to a singular composite map of a biometric signature.

If it is determined that the person is the user, 330:Y, then the voice signal may be parsed 340. For example, the speech including any audible commands may be parsed. The parsing of the speech may be based on a relevant NLP technique. The parsing of the speech may include performing an audible command contained in the voice signal. For example, unlocking the computing device or transmitting received messages to the TFBH. In another example, the voice signal may contain a request for a password of a computing device. The parsing of the voice signal may include displaying the password on the display of the computing device. After parsing of the voice signal at 340, method 300 ends at 395.

If it is determined that the person is not authenticated as the user, 330:N, then negative authentication action may be performed at 350. The negative authentication action may include ignoring the voice signal. The negative authentication action may include storing the voice signal for later playback by an authenticated user. The voice signal may be stored in the headphones directly and may be accessed by an authenticated user through a wake command. The voice signal may be stored in a computing device communicatively coupled to the TFBH. The negative authentication action may include generating an unauthenticated flag including a notification of a false attempt to authenticate. The unauthenticated flag may be displayed on a display of the computing device. After performing a negative authentication action at 350, method 300 ends at 395.

Figure 4:
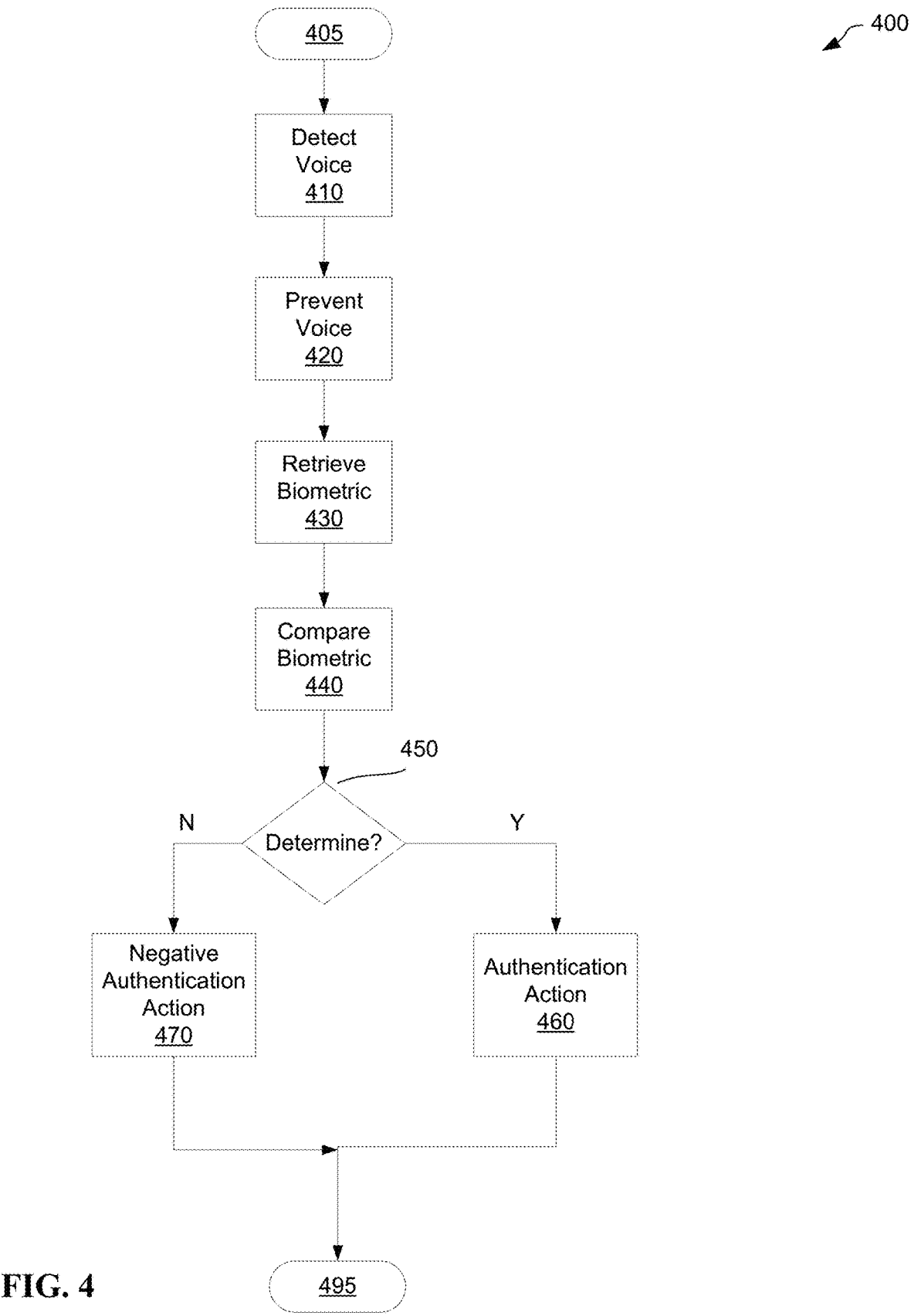
FIG. 4 depicts an example method of biometric authentication through a TFBH, consistent with some embodiments of the disclosure.

FIG. 4 depicts an example method 400 of biometric authentication through a TFBH, consistent with some embodiments of the disclosure. A TFBH may be operated according to method 400 by a headphone. In some embodiments, operation may be performed collectively by a pair of headphones. For example, right headphone 210-1 and left headphone 210-2 may each perform one or more operations of method 400 in parallel. In another example, right headphone 210-1 may perform some operations and left headphone 210-2 may perform other operations to complete method 400 collectively.

Method 400 begins at 405, when a voice signal is detected at 410. The voice signal may be detected by receiving the voice signal from a microphone of a headphone. The voice signal may include speech of a person. The voice signal may include audible commands from a person. The voice signal may be detected as it enters a queue for audio processing by a processor. For example, the headphones may contain wiring, circuitry, or other routes whereby input from a microphone is converted into a stream of electronical signals (e.g., a voice signal).

At 420, the voice signal may be prevented from being processed by any processor. Prevention of processing may include removing the voice signal from the queue. Prevention of processing may include issuing a stop command to a processor for processing of stream of the voice signal. Preventing may include intercepting of the voice signal before it has had a chance to be processed. Preventing may include creating a delay in processing of the stream of the voice signal. For example, issuing a command that causes a delay of a fixed amount of time, such as one second, 300 milliseconds, etc.

At 430 a biometric signature may be retrieved. The biometric signature may include one or more biometric features of a user of the TFBH. The biometric features of the user may include a mapping of facial features. The biometric features may include facial features generated from reading of lips, nose, cheeks, brows, or other facial features. The biometric signature may be a composite facial signature. The composite facial signature may include a left side and a right side of a face of a user. The composite facial signature may be built by combining (e.g., using an image-editing algorithm to stitch together) two or more separate images of the left side and the right side. For example, previously, a left side scan may have occurred separately from a right side scan of a face of a user. The biometric signature may include a voice signature of the user. The voice signature may include pitch, speed, or other attributes that uniquely identify the user.

At 440 one or more biometric readings of biometric features of a person that is wearing the headphones may be compared to the biometric signature. For example, a voice signature may be compared with the voice signal that was detected at 410. The comparison at 440 may determine if the one or more features of the person that is currently wearing the headphones matches the biometric signature.

Based on the comparison at 440, it may be determined if the user is authenticated or not at 450. For example, if the biometric features that are currently being measured by the headphones worn by a person match the retrieved biometric signature, then the person is authenticated to be the user. In another example, if the biometric features that are currently being measured by the headphones worn by a person do not match the retrieved biometric signature, then the person is not authenticated to be the user.

If the person is determined as authenticated 450:Y, then an authentication action may be performed at 460. For example, if the voice signal was removed from a processing queue, it may be reinserted to the processing queue. The authentication action may include forwarding the voice signal to a computing device for analysis and processing. The authentication action may include processing the voice signal. After the authentication action at 460, method 400 ends at 495.

If the person is determined as not authenticated 450:N, then a negative authentication action may be performed at 470. The negative authentication action may include deleting the voice signal. The negative authentication action may include ignoring the voice signal. The negative authentication action may include notifying a user of an unauthorized attempt to access a voice-assistant through the headphones. After the negative authentication action at 470, method 400 ends at 495.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting a voice signal in a headphone, wherein the voice signal includes a spoken audible command spoken by a person which cause the headphone to generate audible responses for hearing by the person;
   generating a biometric scan of a face of the person including one or more biometric features of the biometric scan by the headphone while being worn, wherein the biometric scan is generated by a facial mapper integrally coupled to the headphone which comprises two-factor biometric headphones,
   wherein the facial mapper generates a composite facial map of the person wearing the two-factor biometric headphones based on a composite set of biometric data collected by the facial mapper that is one of non-continuous and non-overlapping;
   retrieving, based on detecting the voice signal, a first biometric signature of a user including one or more facial features;
   comparing the first biometric signature to the one or more biometric features of the person;
   determining, based on comparing the first biometric signature to the one or more biometric features, an authentication of the user; and
   performing, based on detecting the voice signal and in response to verifying the authentication, an authentication action.

2. The method of claim 1, further comprising:
   intercepting, based on detecting the voice signal, the voice signal from an audio processing queue; and
   delaying the voice signal from being processed by an audio processing device.

3. The method of claim 2, wherein:
   determining the authentication of the user includes determining the person speaking the audible command is the user, and
   wherein the one or more biometric features include facial features of lips, nose, cheeks or brows.

4. The method of claim 3, wherein:
   performing the authentication action includes processing the audible command, wherein the one or more biometric features include a pattern, a shape, a print, a movement, a curl, and a range of movement of the lips, and wherein the two-factor biometric headphones include a right headphone and a left headphone, the right and left headphones including the facial mapper.

5. The method of claim 3, wherein:

performing the authentication action includes forwarding the voice signal to a smartphone, wherein the smartphone is communicatively coupled to the headphone.

6. The method of claim 2, wherein:

determining the authentication of the user includes determining the person speaking the audible command is not the user.

7. The method of claim 6, wherein:

performing the authentication action includes ignoring the voice signal.

8. The method of claim 6, wherein:

performing the authentication action includes deleting the voice signal.

9. The method of claim 6, wherein:

performing the authentication action includes not forwarding the voice signal to a smartphone, wherein the smartphone is communicatively coupled to the headphone.

10. The method of claim 6, wherein performing the authentication action includes:

forwarding the voice signal to a smartphone, wherein the smartphone is communicatively coupled to the headphone;

generating, based on the person speaking the audible command, an unauthenticated flag; and transmitting the unauthenticated flag to the smartphone.

11. The method of claim 1, wherein the audible command includes requesting a reading of one or more text messages stored on a smartphone of the user.

12. The method of claim 1, wherein the audible command includes unlocking a computing device of the user.

13. The method of claim 1, wherein the first biometric signature of the user is movement of one or more lips of the user based on an ultrasonic scan by the headphone, and the ultrasonic scan is disabled when an expandable portion of the headphone is in a retracted position.

14. The method of claim 1, wherein the first biometric signature of the user is a three-dimensional mapping of the nose of the user by the headphone.

15. The method of claim 1, wherein the first biometric signature of the user is a composite biometric signature of the user gathered by the facial mapper of the headphone.

16. The method of claim 15, wherein the headphone includes a pair of headphones, the method further comprising:

mapping, by a left headphone of the headphones, a left side of a first facial feature of the user;

mapping, by a right headphone of the headphones, a right side of the first facial feature of the user; and generating, by a computing device and based on the mapping of the left side and based on the mapping of the right side, the composite biometric signature of the user.

17. The method of claim 1, wherein:

the first biometric signature is stored in a secure segment, wherein the secure segment is communicatively coupled to the headphone;

the comparing the first biometric signature to the one or more biometric features of the person is performed in the secure segment; and the determining the authentication of the user includes receiving the authentication from the secure segment.

18. A system, the system comprising:

a memory, the memory containing one or more instructions; and a processor, the processor communicatively coupled to the memory, the processor, in response to reading the one or more instructions, configured to:

detect a voice signal in a headphone, wherein the voice signal includes a person speaking an audible command and the headphone includes a speaker housing to direct sound down into an ear of the person;

retrieve, based on detecting the voice signal, a first biometric signature and a second biometric signature of a user;

compare the first biometric signature to a first biometric feature of the person;

gather a second biometric feature of the person by the headphone while being worn, wherein the second biometric feature is gathered by a facial mapper integrally coupled to the headphone which comprises two-factor biometric headphones, wherein the facial mapper generates a composite facial map of the person wearing the two-factor biometric headphones based on a composite set of biometric data collected by the facial mapper that is one of non-continuous and non-overlapping;

compare the second biometric signature of the user with the second biometric feature;

determine, based on comparing the first biometric signature to the first biometric feature and the second biometric signature of the user with the second biometric feature, an authentication of the user; and perform, based on detecting the voice signal and in response to verifying the authentication, an authentication action.

19. A computer program product, the computer program product comprising:

one or more computer readable storage media; and program instructions collectively stored on the one or more computer readable storage media, the program instructions configured to:

detect a voice signal in a two-factor biometric headphone, wherein the voice signal includes a person speaking an audible command and the headphone includes an earbud style headphone;

retrieve, based on detecting the voice signal, a first biometric signature of a user including a voice signature of the user;

compare the first biometric signature to one or more biometric features of the person from the detected voice signal;

determine, based on comparing the first biometric signature to the one or more biometric features and a second factor comparing a second biometric signature and a second biometric feature, an authentication of the user, wherein the second biometric feature is gathered by a facial mapper integrally coupled to the headphone while the headphone is worn by the person, the headphone comprising a two-factor biometric headphone, wherein the facial mapper generates a composite facial map of the person wearing the two-factor biometric headphone based on a composite set of biometric data collected by the facial mapper that is one of non-continuous and non-overlapping; and perform, based on detecting the voice signal and in response to verifying the authentication, an authentication action.

20. The computer program product of claim 19, wherein determine the authentication of the user includes determining the person speaking the audible command is the user, and wherein determining of the authentication of the user includes verifying the second factor using the two-factor biometric headphone by:
- retrieving the second biometric signature of the user;
- gathering the second biometric feature of the person using the two-factor biometric headphone; and
- comparing the second biometric signature of the user with the second biometric feature,
- wherein the authentication of the user by the two-factor biometric headphone is triggered based on performing a natural language processing to detect the audible command within the voice signal.

* * * * *